P2,748,158
Patented May 29, 1956

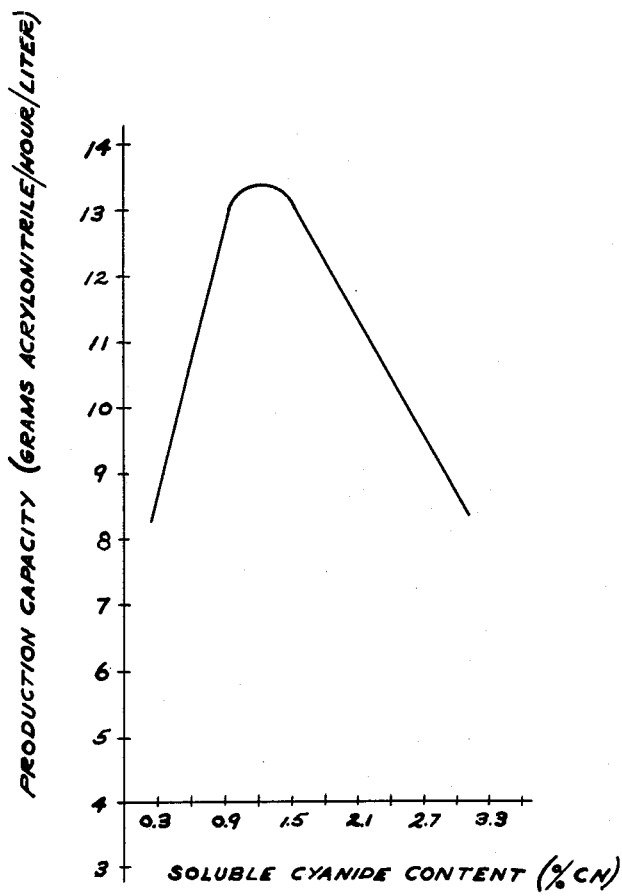

United States Patent Office

2,748,158
MANUFACTURE OF ACRYLONITRILE

Albert L. Van Amburg, Jr., Dayton, Ohio, assignor to Monsanto Chemical Company, St. Louis, Mo., a corporation of Delaware Application January 21, 1953, Serial No. 332,441

3 Claims. (Cl. 260—465.3)

This invention relates to the manufacture of acrylonitrile and more particularly to the process of producing acrylonitrile by the catalytic reaction of hydrocyanic acid and acetylene in the presence of cuprous salt catalysts.

The catalytic reaction of hydrogen cyanide and acetylene to produce acrylonitrile has been described in U. S. Re. 23,265. The catalyst which is described in this patent is an aqueous solution of cuprous chloride containing various added salts. It has been found that large variations in yield occur in the operation of processes employing such cuprous chloride salts because of the formation of catalytic complexes of varying composition, certain forms of which render the solution less efficient in the reaction.

It is an object of the present invention to provide a process and catalyst for producing acrylonitrile which can be maintained at a high level of productivity.

It has now been found that the process for producing acrylonitrile may be operated to maintain an optimum high level of production if the copper catalyst is so controlled as to composition to maintain a specific content of soluble cyanide. This control of the cyanide content is effected by controlling the hydrochloric acid addition rate.

The acrylonitrile process is carried out by bringing acetylene together with hydrogen cyanide into contact with an aqueous acid reacting solution of cuprous chloride, said solution containing also an inorganic chloride selected from the group consisting of sodium, potassium and ammonium chlorides and mixtures thereof. Acetylene and hydrogen cyanide are catalytically combined, probably through the formation of intermediate compounds, to produce acrylonitrile which is then volatilized from the aqueous solution and is subsequently recovered and purified.

However, it has been found that as a result of the constant addition of hydrogen cyanide to copper salts certain complex compounds are formed rendering the copper unavailable to function in the catalytic reaction of acetylene with hydrogen cyanide to form acrylonitrile.

The present invention provides a method for maintaining a high level of productivity of the copper catalyst by maintaining the proportion of soluble cyanide (calculated as CN) in the solution at a particular concentration range. It has been found that the cyanide content must be maintained within the limits of 0.6 to 1.8 weight per cent in order to obtain the maximum productivity of acrylonitrile. This is accomplished by the continuous or intermittent addition of HCl to the catalyst solution.

The initial composition of the catalyst solution is subject to substantial variation. The following initial catalyst composition is typical—the ingredients being shown in parts by weight:

| | |
|---|---|
| $Cu_2Cl_2$ | from 500 to 750 |
| Inorganic chlorides selected from the group consisting of K, Na and $NH_4$ chlorides | from 300 to 500 |
| HCl | from 0.5 to 30 |
| $H_2O$ | from 500 to 800 |

A preferred initial range of concentrations is given below in parts by weight:

| | |
|---|---|
| $Cu_2Cl_2$ | from 650 to 725 |
| Inorganic chlorides selected from the group consisting of K, Na and $NH_4$ chloride | from 400 to 480 |
| HCl | from 1 to 15 |
| $H_2O$ | from 550 to 700 |

The solution is maintained within the temperature limits of 70° C. to 100° C. in carrying out the catalytic reaction. Acetylene and hydrogen cyanide are fed to the catalytic solution in the proportions of from 4 to 12 moles of acetylene per mole of hydrogen cyanide.

It has been found that the highest level of productivity of the solution is obtained when the content of soluble cyanide is maintained between the levels of 0.6% to 1.8% by weight. This is illustrated in the drawing accompanying the present application, in which the relationship of the soluble cyanide content to the production capacity at substantially constant feed rates has been plotted. In this drawing, it is seen that the concentration, as set forth above, corresponds to the highest production capacity of the catalytic solution.

The determination of the cyanide content of the solution is carried out as follows:

A sample of the catalytic solution is weighed and is transferred to a distillation flask. Hydrochloric acid is added and the flask is heated to decompose metallic cyanides and to volatilize hydrocyanic acid. The vapors of hydrogen cyanide are collected in a sodium hydroxide solution. A titration of the sodium hydroxide solution with silver nitrate in the presence of ammonium hydroxide and potassium iodide (the Deniges method) then gives the amount of hydrogen cyanide present as such together with the HCN combined as soluble cyanides in the catalytic solution. The amount of HCN formed of this method may be calculated to CN for purpose of control.

During operation the soluble cyanide content of the catalyst changes. However, by maintaining a continuous or intermittent addition of HCl to the solution so as to maintain the soluble cyanide content in the range of from 0.6% to 1.8% by weight, the productivity of the catalyst will be maintained at a high level.

Example 1

A catalytic solution was prepared from the following components in which the parts are by weight:

181 parts of water
15 parts of 37% HCl
41 parts of NaCl
111 parts of KCl
231 parts of $Cu_2Cl_2$ The solids were dissolved by stirring the mixture at 80° C. The reacting gases were then charged in the ratio of approximately 10 moles of acetylene to one mole of hydrogen cyanide, corresponding to approximately 21.6 parts by weight of acetylene and 2.24 parts of HCN. Water and hydrogen chloride escaping from the catalyst during operation were returned to the reactor. $NH_4Cl$ is formed in the catalyst, amounting to 23 parts after 1000 hours of operation. During such a period of operation, and after several days of continuous use, when the catalyst had attained steady state of operation, the maximum acrylonitrile production rate remained constant at approximately 13 grams per hour per liter of catalyst. During this time a small amount of hydrogen chloride was added to maintain the soluble cyanide concentration at 1.5% by weight (calculated as CN) of catalyst solution. The total acid, as HCl, content of the catalyst solution was of the order of 1.4%.

Example II

The catalytic solution shown in Example I was continuously used with modification of the soluble cyanide content by variation of the HCN feed rate and also by changing the rate of addition of hydrochloric acid. The following production rate was obtained:

| Percent CN in Catalyst | Production Rate g. Acrylonitrile per hr. per liter of Catalyst |
|---|---|
| 3.0 | 9.4 |

Example III

In order to show the reversible effect of the controlling factor of soluble cyanide content, the same solution as utilized in the previous examples was then restored to the optimum conditions by the addition of HCl. It was then found that the production rate had changed as follows:

| Percent CN in Catalyst | Production Rate g. Acrylonitrile per hr. per liter of Catalyst |
|---|---|
| 1.1 | 12.5 |

In each of the preceding examples the rate of addition of HCl, after the desired soluble cyanide content is reached, is rather small; being in the order of about one gram of an 18% solution of HCl per liter of catalyst per hour.

This application is a continuation-in-part of my copending application Serial No. 212,350, filed February 23, 1951 and now abandoned.

What is claimed is:

1. A process for the production of acrylonitrile which comprises bringing acetylene together with hydrogen cyanide into contact with an aqueous acid reacting solution of cuprous chloride, said solution containing also an inorganic chloride selected from the group consisting of sodium, potassium and ammonium chlorides and mixtures thereof, while maintaining the concentration of soluble cyanide present therein within the limits of from about 0.6% to about 1.8% by weight of catalyst solution, calculated as CN, by the addition of hydrochloric acid.

2. A process for the production of acrylonitrile which comprises passing into a catalyst solution containing intially the following ingredients, in parts by weight:

| | |
|---|---|
| $Cu_2Cl_2$ | from 500 to 750 |
| Inorganic chlorides selected from the group consisting of Na, K and $NH_4$ chlorides, and mixtures thereof | from 300 to 500 |
| HCl | from 0.5 to 30 |
| $H_2O$ | from 500 to 800 | acetylene and hydrogen cyanide in the proportion of from 4 to 12 moles of acetylene per mole of hydrogen cyanide, the temperature of said solution being maintained within the limits of 70° C. to 100° C., while maintaining the concentration of soluble cyanide present therein within the limits of from about 0.6% to about 1.8% by weight of catalyst solution, calculated as CN, by the addition of hydrochloric acid.

3. A process for the production of acrylonitrile which comprises passing into a catalyst solution containing initially the following ingredients, in parts by weight:

| | |
|---|---|
| $Cu_2Cl_2$ | from 650 to 725 |
| Inorganic chlorides selected from the group consisting of Na, K and $NH_4$ chlorides, and mixtures thereof | from 400 to 480 |
| HCl | from 1 to 15 |
| $H_2O$ | from 550 to 700 | acetylene and hydrogen cyanide in the proportion of from 4 to 12 moles of acetylene per mole of hydrogen cyanide, the temperature of said solution being maintained within the limits of 70° C. to 100° C., while maintaining the concentration of soluble cyanide present therein within the limits of from about 0.6% to about 1.8% by weight of catalyst solution, calculated as CN, by the addition of hydrochloric acid.

References Cited in the file of this patent

UNITED STATES PATENTS

| | | |
|---|---|---|
| 2,417,068 | Farlow | Mar. 11, 1947 |
| 2,423,318 | Howk | July 1, 1947 |
| 2,442,040 | Foster | May 25, 1948 |
| 2,688,632 | Carpenter et al. | Sept. 7, 1954 |